3,458,407
METHOD OF PRODUCING NICKEL POWDER
Lewis J. Wrangell, Wauwatosa, Wis., assignor to Allis-Chalmers Manufacturing Company, Milwaukee, Wis.
No Drawing. Filed Dec. 9, 1964, Ser. No. 417,214
Int. Cl. C22d 1/14, 5/00
U.S. Cl. 204—10   16 Claims

ABSTRACT OF THE DISCLOSURE

An electrolytic process for producing a finely divided nickel powder having a surface area greater than 3 m.$^2$/gm., utilizing an electrolyte comprising an aqueous solution of ammonium hydroxide with a pH of about 12.6 containing a metallic cathode and a nickel anode. The powder is deposited at a current density of from 0.007 to 0.090 amp./cm.$^2$.

---

This invention relates generally to the production of nickel powders. More specifically, this invention relates to an electrolytic method for producing finely divided nickel powders having an extremely large surface area.

Although nickel powders were originally produced primarily by pyrometallurgical process from nickel carbonyl, some commercial developments have been made in the past for producing nickel powder electrolytically. For example, the Mantell process, described in U.S. 2,333,103 and the Mayper process described in U.S. 2,625,507 are quick, reliable and inexpensive electrolytic processes for producing nickel powders which are readily adaptable to either laboratory or commercial operations.

Although the nickel powders as produced by the Mantell and Mayper processes are perfectly suited for many applications, they are suitable only to a very limited extent for other applications where a large surface area is desirable, as for example, in the fuel cell and related arts. In the fuel cell art, porous nickel electrodes are often desirable for some applications wherein it is necessary that these electrodes have the greatest possible surface area.

The Mantell and Mayper processes are capable of producing nickel powders having surface areas up to about 0.7 m.$^2$/gm. which is a rather large surface area by prior art standards. Accordingly, these powders could be used to produce bodies such as fuel cell electrodes having moderately high surface areas. However, it has been deemed highly desirable if even greater surface areas could be obtained.

This invention is predicated upon my discovery of a new and improved method for producing nickel powders wherein surface areas in excess of about 3 m.$^2$/gm. can be readily obtained.

Accordingly, it is a primary object of this invention to provide a simple electrolytic process for producing nickel powders having surface areas in excess of about 3 m.$^2$/gm.

It is another primary object of this invention to provide a new and improved electrolytic process for producing finely dividel nickel powders which is inexpensive, reliable and adaptable to commercial operation.

These and other objects and advantages are fulfilled by this invention as will become apparent from a full understanding of the following detailed description.

In a preferred embodiment of this invention the electrolyte comprises an aqueous solution of ammonium hydroxide with a concentration of from about 90 to about 150 ml. of ammonium hydroxide per liter of electrolyte with the preferred concentration being at about 90 ml. This preferred concentration will provide a starting pH of about 12.6. The cathode and anode should consist of refined metallic nickel. Although other conductive metals which will not be affected by the electrolyte can be substituted for the cathode, as for example stainless steel, nickel is preferred because the nickel cathodes may be periodically cleaned by using as anodes while simultaneously depositing nickel therefrom upon other nickel cathodes. The anode, however, must consist of nickel since by this embodiment it constitutes the only source of nickel for deposition. It is preferable that the spacing between anode and cathode be about one-half inch. Of course, for commercial operations, it will usually be desirable to provide a plurality of anodes and cathodes alternately spaced. As would be expected, it is preferable that the electrodes have about the same general dimensions and be directly opposed from each other.

Proceeding to deposit out a finely divided nickel powder, the cathode current density should be from about 0.007 to about 0.015 amp./cm.$^2$; with a preferred current density of about 0.009 amp./cm.$^2$ for most operations. Under certain conditions to be discussed subsequently, higher currents can be used to produce greater yields. The bath should not be heated as optimum results can be obtained from room temperatures to about 40° C. The plating time should be continued for a period of about six to seven hours, resulting in a yield of about 0.0014 gram of nickel powder per cm.$^2$ of cathode surface area. As deposition progresses, a by-product, ammonium nitrate, is produced in the electrolyte.

Agitation and substantial circulation of the bath should be avoided to prevent drop-off of the deposited powder. Moreover, excessive agitation can be expected to cause a reduction of the surface area of the resulting powder.

When the plating is complete, the cathode, or cathodes may be removed from the bath and the nickel powder easily washed from the surface. If the cathodes are allowed to dry, the powder may be easily brushed from the surface. Nickel drop-off within the electrolyte will have the same characteristics as that deposited, as it may be desirable to recover such drop-off.

In practicing this invention, a definite nonlinear relationship between deposition time and yield has been noted. During about the first hour of operation there is some nickel deposition, but little or no recoverable yield. The reasons for this are two-fold. First, before nickel can be deposited on the cathode, it must first be removed from the anode and transported to the cathode, and of course some time must pass before the nickel ion concentration is substantial enough to be effective. Second, the small amount of deposition that does occur during the first hour or so clings to the cathode too tightly to constitute recoverable yield. Between the first and third hours however, deposition proceeds at its greatest rate, producing a majority of the recoverable yield. Then beyond the third hour, deposition gradually diminishes, until after about the sixth or seventh hour, no further significant deposition will occur. The diminishing deposition rate is due in part to progressing changes in composition of the bath, such as reductions in ammonium hydroxide concentration, reductions in pH, and increases in ammonium nitrate concentration. This diminishing deposition rate may also be due in part to the decreasing cathode current density which results from the increasing cathode surface area as the powder is deposited. Concerning the changes in concentration more specifically, during about six and one-half hours of deposition time, the pH of the bath will drop from a value of about 12.6 to a value of about 10.9. For the same period of time, the ammonium hydroxide concentration will drop from 90 to about 34 ml., whereas the ammonium nitrate concentration will rise from 0 to about 2 grams per liter of electrolyte.

With the above considerations in mind, it is possible to increase the yield by correcting at least some of the noted changes. For example, over a three-hour period the ammonium hydroxide concentration normally drops from about 90 ml. to about 56 ml. Therefore, if after three hours of deposition, 34 or more ml. of ammonium hydroxide are added to the bath to restore or exceed the original concentration, about a 25 percent increase in total yield can be realized. This represents a partial, but significant restoration to the optimum yield rate. Subsequent adjustments of the ammonium hydroxide concentration at three-hour intervals will progressively be less effective because of the continuing buildup of the ammonium nitrate which is known to inhibit deposition as a function of concentration.

The pH value loses its significance after subsequent additions of ammonium hydroxide to the original electrolyte. That is to say, that although the ammonium hydroxide concentration can be restored at any time to its original value, the pH values are not restored accordingly. This is because the ammonium nitrate formed during electrolysis depresses the pH by acting as a buffer.

As stated above, the desired temperature of the bath during electrolysis should be within a range of from room temperature to about 40° C. Higher temperatures will cause a more rapid consumption of ammonium hydroxide which adversely affects both the electrolysis characteristics and the yield. Thus, it may be necessary at times to periodically halt the electrolysis if the bath tends to become overheated.

It was stated above that the preferred cathode current density is about 0.009 amp./cm.$^2$ (8.3 amp./ft.$^2$) for most operations. Powder characteristics are more or less dependent upon current density, whereas it has been noted that the yield per unit of cathode surface is more directly related to the current. That is, increases in current cause proportional increases in yield. However, substantial increases in current, without reduction in the resistivity of the electrolyte, will usually also cause severe overheating. As noted above, this is detrimental as high temperatures will result in a rapid consumption of ammonium hydroxide. Accordingly, any method whereby the current can be increased without resulting in an increase in temperature would be desirable since increased yields would be realized. I have learned of two ways in which this can be done without resorting to customary external cooling devices. One way would be to increase the ratio of electrolyte to cathode surface area so that the greater volume of electrolyte can dissipate the heat. The disadvantage of this method is the obvious waste of electrolyte which would not be desirable for commercial operations. Another method of using higher current without exceeding the temperature limitations is to make the electrolyte more conductive by the addition of conductive salts such as ammonium sulfate and ammonium nitrate in amounts up to about 4 gm./liter. Any conductive salt should work satisfactorily, provided it is compatible with the electrolyte and electrodes. By "compatible" I mean any conductive salt, such as the ammonium salts, which will not adversely affect the electrolyte through chemical reactions or attack the electrodes. Chloride salts, for example, should not be used because they will corrode the nickel anode and cause the deposited powder to be larger in size with a reduced surface area.

The yield and operating temperature of the bath are also a function of the electrode spacing distance. It was stated above that the spacing between electrodes should be about ½ inch. A deviation of ±1/16 inch would not be detrimental. However, closer spacings of 5/16 inch or less will substantially decrease the yield, while greater spacings of about 7/8 inch or more will not only decrease the yield, but cause severe overheating.

It should be mentioned that the cathode surface condition is also important. The cathode surface capable of accepting deposition for constant maximum yields is one which has had at least one deposition of nickel powder and which has been thoroughly wiped or brushed before reuse. Several successive depositions at optimum yield can then be made before the yields become erratic. Reconditioning of the cathode can then be accomplished by using it as an anode to thoroughly remove deposited nickel.

In the above described embodiment and the modifications thereto, the only source of nickel is the nickel anode. I have found that some increases in yield can be realized if a supplemental source of nickel is provided by adding a small amount of compatible nickel salts to the electrolyte, such as nickel ammonium sulfate. Although this will increase yield to a limited extent, primarily because nickel ions are immediately and always available for deposition, there are several attendant disadvantages which complicates the use of such salts. For example, the concentration of such salts must be kept extremely low, at say below 0.4 gram of nickel per liter. If greater concentrations are used, the nickel will deposit as a plate or foil until the lower critical concentration is reached, and the deposited powder usually tends to have a somewhat lower surface area. Such low concentrations as those necessary, are quickly depleted. Therefore, if the use of such salts is to be effective, small continual or periodic additions of the salt must be made during deposition. If time is a major consideration, it may be desirable to add the nickel salts at the beginning of the process so that nickel ions are immediately available for deposition. Then by the time this concentration is depleted, sufficient nickel from the anodes will be in solution to carry on without further additions of the nickel salt.

I have further learned that using screen cathodes in mesh sizes up to about 100 mesh will enhance the yield. It is believed that the discontinuity of the screen is at least partially responsible for this increased yield. Furthermore, the decreased surface area causes an increased current density which may also contribute to the increase in yield besides causing an increase in the surface area of the deposited nickel powder. By using such screen cathodes, cathode current densities as high as 0.090 amp./cm.$^2$ can be used without the usual attendant temperature complications as noted above.

The embodiments of the invention in which an exclusive property or privilege is claimed are defined as follows:

1. A method of producing finely divided nickel powder having a surface area in excess of about 3 square meters per gram which comprises; providing an aqueous solution of ammonium hydroxide at a concentration of from 90 to 150 milliliters of ammonium hydroxide per liter of solution, providing at least one metallic cathode and at least one nickel anode in said solution, maintaining a cathode current density of from 0.007 to 0.090 ampere per square centimeter for a period of from 2 to 7 hours.

2. A method of producing finely divided nickel powder having a surface area in excess of about 3 square meters per gram which comprises; providing an aqueous solution of ammonium hydroxide at a concentration of about 90 to 150 milliliters of ammonium hydroxide per liter of solution, providing at least one metallic cathode and at least one nickel anode in said solution spaced apart at a distance of about ½ inch, and maintaining a cathode current density of from about 0.007 to 0.090 ampere per square centimeter for a period of from 2 to 7 hours while nickel powder is deposited on the cathodes.

3. A method of producing finely divided nickel powder having a surface area in excess of about 3 square meters per gram which comprises; providing an aqueous solution of ammonium hydroxide at a concentration of about 90 milliliters of ammonium hydroxide per liter of solution, providing at least one metallic cathode and at least one nickel anode in said solution spaced apart at a distance of about ½ inch, and maintaining a cathode current density of about 0.007 to 0.015 ampere per square centimeter for a period of from 2 to 7 hours while nickel powder is deposited on the cathodes.

4. A method of producing finely divided nickel powder having a surface area in excess of about 3 square meters per gram which comprises; providing an aqueous solution of ammonium hydroxide at a concentration of about 90 to 150 milliliters of ammonium hydroxide per liter of solution and containing at most about 4 grams per liter of a compatible conductive salt providing at least one metallic cathode and at least one nickel anode in said solution spaced apart at a distance of about ½ inch, and maintaining a cathode current density of from 0.009 to 0.015 ampere per square centimeter for a period of from 2 to 7 hours while nickel powder is deposited on the cathodes.

5. A method of producing finely divided nickel powder having a surface area in excess of about 3 square meters per gram which comprises; providing an aqueous solution of ammonium hydroxide at a concentration of about 90 milliliters of ammonium hydroxide per liter of solution, and containing at most about 4 grams per liter of a compatible conductive salt, providing at least one metallic cathode and at least one nickel anode in said solution spaced apart at a distance of about ½ inch, and maintaining a cathode current density of about 0.009 to 0.015 ampere per square centimeter for a period of from 2 to 7 hours while nickel powder is deposited on the cathodes.

6. A method of producing finely divided nickel powders having a surface area in excess of about 3 square meters per gram which comprises; providing an aqueous solution of ammonium hydroxide at a concentration of from 90 to 150 milliliters of ammonium hydroxide per liter of solution, providing at least one metallic cathode and at least one nickel anode in said solution spaced apart at a distance of about ½ inch, maintaining a cathode current density of about 0.009 to 0.015 ampere per square centimeter for a period of about 2 to 3 hours while nickel powder is deposited on the cathodes and the ammonium hydroxide concentration is depleted, adding more ammonium hydroxide to the solution to at least partially restore its original concentration, maintaining a cathode current density of about 0.007 to 0.015 ampere per square centimeter for another 2 to 3 hours, and removing the deposited nickel powder from said cathodes.

7. A method of producing finely divided nickel powders having a surface area in excess of about 3 square meters per gram which comprises; providing an aqueous solution of ammonium hydroxide at a concentration of from 90 to 150 milliliters of ammonium hydroxide per liter of solution, providing at least one metallic cathode and at least one nickel anode in said solution spaced apart at a distance of about ½ inch, maintaining a cathode current density of at least 0.009 to 0.015 ampere per square centimeter for a period of about 2 to 3 hours while nickel powder is deposited on the cathode and the ammonium hydroxide concentration is depleted, adding more ammonium hydroxide to the solution to at least partially restore its original concentration, maintaining a cathode current density of at least 0.009 to 0.015 ampere per square centimeter for another 2 to 3 hours, removing the cathodes from the solution, and removing the deposited nickel powder from said cathodes.

8. A method of producing finely divided nickel powders having a surface area in excess of about 3 square meters per gram which comprises; providing an aqueous solution of ammonium hydroxide at a concentration of about 90 milliliters of ammonium hydroxide per liter of solution, providing at least one metallic cathode and at least one nickel anode in said solution spaced apart at a distance of about ½ inch, maintaining a cathode current density of about 0.009 to 0.015 ampere per square centimeter for a period of about 2 to 3 hours while nickel powder is deposited on the cathode and the ammonium hydroxide concentration is depleted, adding a sufficient amount of ammonium hydroxide to the solution to at least partially restore its original concentration, maintaining a cathode current density of about 0.009 to 0.015 ampere per square centimeter for another 2 to 3 hours, removing the cathodes from the solution, and removing the deposited nickel powder from said cathodes.

9. A method of producing finely divided nickel powders having a surface area in excess of about 3 square meters per gram which comprises; providing an aqueous solution of ammonium hydroxide at a concentration of about 90 milliliters of ammonium hydroxide per liter of solution, providing at least one metallic cathode and at least one nickel anode in said solution spaced apart at a distance of about ½ inch, maintaining a cathode current density of about 0.009 to 0.015 ampere per square centimeter for a period of about 2 to 3 hours while nickel powder is deposited on the cathode and the ammonium hydroxide concentration is depleted, adding about 30 to 40 milliliters of ammonium hydroxide per liter of solution to the solution to approximately restore its original concentration, maintaining a cathode current density of about 0.009 to 0.015 ampere per square centimeter for another 2 to 3 hours, removing the cathodes from the solution, and removing the deposited nickel from said cathodes.

10. A method of producing finely divided nickel powders having a surface area in excess of about 3 square meters per gram which comprises; providing an aqueous solution of ammonium hydroxide at a concentration of from 90 to 150 milliliters of ammonium hydroxide per liter of solution and containing at most about 4 grams per liter of ammonium sulfate, providing at least one metallic cathode and at least one nickel anode in said solution spaced apart at a distance of about ½ inch, maintaining a cathode current density of from 0.009 to 0.015 ampere per square centimeter for a period of about 2 to 3 hours while nickel powder is deposited on the cathode and the ammonium hydroxide concentration is depleted, adding more ammonium hydroxide to the solution to at least partially restore its original concentration, maintaining a cathode current density of about 0.009 to 0.015 ampere per square centimeter for another 2 to 3 hours, removing the cathodes from the solution, and removing the deposited nickel powder from said cathodes.

11. A method of producing finely divided nickel powders having a surface area in excess of about 3 square meters per gram which comprises; providing an aqueous solution of ammonium hydroxide at a concentration of about 90 milliliters of ammonium hydroxide per liter of solution and containing at most about 4 grams per liter of ammonium sulfate, providing at least one metallic cathode and at least one nickel anode in said solution spaced apart at a distance of about ½ inch, maintaining a cathode current density of at least 0.009 to 0.015 ampere per square centimeter for a period of about 2 to 3 hours while nickel powder is deposited on the cathode and the ammonium hydroxide concentration is depleted, adding more ammonium hydroxide to the solution to at least partially restore its original concentration, maintaining a cathode current density of at least 0.009 to 0.015 ampere per square centimeter for another 2 to 3 hours, removing the cathodes from the solution, and removing the deposited nickel powder from said cathodes.

12. A method of producing finely divided nickel powders having a surface area in excess of about 3 square meters per gram which comprises; providing an aqueous solution of ammonium hydroxide at a concentration of about 90 milliliters of ammonium hydroxide per liter of solution, providing at least one metallic screen cathode and at least one nickel anode in said solution spaced apart at a distance of about ½ inch, maintaining a cathode current density of about 0.009 to 0.090 ampere per square centimeter for a period of about 2 to 3 hours while nickel powder is deposited on the cathode and the ammonium hydroxide concentration is depleted, adding about 30 to 40 milliliters of ammonium hydroxide per liter of solution to the solution to approximately restore its original concentration, maintaining a cathode current density of about 0.009 to 0.090 ampere per square centimeter for another 2 to 3 hours, removing the cathodes from the solution, and brushing the deposited nickel from said cathodes.

13. A method of producing finely divided nickel powders having a surface area in excess of about 3 square meters per gram which comprises; providing an aqueous solution of ammonium hydroxide at a concentration of from 90 to 150 milliliters of ammonium hydroxide per liter of solution and containing at most about 4 grams per liter of ammonium sulfate, providing at least one metallic screen cathode at least as coarse as 100 mesh and at least one nickel anode in said solution spaced apart at a distance of about ½ inch, maintaining a cathode current density of from 0.009 to 0.090 ampere per square centimeter for a period of about 2 to 3 hours while nickel powder is deposited on the cathode and the ammonium hydroxide concentration is depleted, adding more ammonium hydroxide to the solution to at least partially restore its original concentration, maintaining a cathode current density of about 0.009 ampere per square centimeter for another 2 to 3 hours, removing the cathodes from the solution, and brushing the deposited nickel powder from said cathodes.

14. A method of producing finely divided nickel powder having a surface area in excess of about 3 square meters per gram which comprises; providing an aqueous solution of ammonium hydroxide at a concentration of from 90 to 150 milliliters of ammonium hydroxide per liter of solution and containing a compatible nickel salt in concentrations below about 0.4 grams of nickel per liter, providing at least one metallic cathode and at least one nickel anode in said solution, maintaining a cathode current density of from 0.007 to 0.090 ampere per square centimeter for a period of from 2 to 7 hours.

15. A method of producing finely divided nickel powder having a surface area in excess of about 3 square meters per gram which comprises; providing an aqueous solution of ammonium hydroxide at a concentration of about 90 to 150 milliliters of ammonium hydroxide per liter of solution, and containing a compatible nickel salt in concentrations below about 0.4 gram of nickel per liter, providing at least one metallic cathode and at least one nickel anode in said solution spaced apart at a distance of about ½ inch, and maintaining a cathode current density of from about 0.007 to 0.090 ampere per square centimeter for a period of from 2 to 7 hours while nickel powder is deposited on the cathodes.

16. A method of producing finely divided nickel powder having a surface area in excess of about 3 square meters per gram which comprises; providing an aqueous solution of ammonium hydroxide at a concentration of about 90 milliliters of ammonium hydroxide per liter of solution and containing a compatible nickel salt in concentrations below about 0.4 gram of nickel per liter, providing at least one metallic cathode and at least one nickel anode in said solution spaced apart at a distance of about ½ inch, and maintaining a cathode current density of about 0.009 to 0.015 ampere per square centimeter for a period of from 2 to 7 hours while nickel powder is deposited on the cathodes.

References Cited

UNITED STATES PATENTS

| | | | |
|---|---|---|---|
| 1,442,238 | 1/1923 | Smith | 136—24.1 XR |
| 2,233,103 | 2/1941 | Mantell | 204—10 |
| 2,625,507 | 1/1953 | Mayper | 204—10 |
| 3,276,921 | 10/1966 | Freeman | 148—31.55 |
| 3,323,951 | 6/1967 | Kreiselmaier | 136—120 |
| 3,335,033 | 8/1967 | Kober | 136—29 |

FOREIGN PATENTS 508,160  12/1954  Canada.

JOHN H. MACK, Primary Examiner

W. VAN SISE, Assistant Examiner

U.S. Cl. X.R.

75—82; 136—29, 75; 204—112